(12) United States Patent
Kawana et al.

(10) Patent No.: US 6,243,347 B1
(45) Date of Patent: Jun. 5, 2001

(54) AUTO-LOADING DISK PLAYER

(75) Inventors: Kazushige Kawana; Seiji Kato; Toshiyuki Fukami; Takehiro Takada, all of Kawagoe (JP)

(73) Assignee: Pioneer Engineering Corporation, Tokyo (JP)

( * ) Notice: Subject to any disclaimer, the term of this patent is extended or adjusted under 35 U.S.C. 154(b) by 0 days.

(21) Appl. No.: 08/658,120

(22) Filed: Jun. 4, 1996

(30) Foreign Application Priority Data

Jun. 5, 1995 (JP) .................................................. P7-161513

(51) Int. Cl.⁷ .................................................... G11B 33/10
(52) U.S. Cl. ............................................................ 369/77.1
(58) Field of Search ................................. 369/75.1, 75.2, 369/77.1; 360/99.02, 99.06

(56) References Cited

U.S. PATENT DOCUMENTS

| | | | | |
|---|---|---|---|---|
| 4,851,938 | * | 7/1989 | Inami | 360/96.5 X |
| 4,974,102 | * | 11/1990 | Hamachi et al. | 360/92 |
| 4,995,027 | * | 2/1991 | Aoyagi et al. | 369/77.1 |
| 5,088,084 | * | 2/1992 | Komiya et al. | 369/75.1 |

* cited by examiner

*Primary Examiner*—William Klimowicz
(74) *Attorney, Agent, or Firm*—Perman & Green, LLP

(57) ABSTRACT

An auto-loading system of disk playback apparatus includes a door open/close detecting device for detecting that a door is being closed when a disk is being ejected, and loads the disk into the disk playback apparatus by the detection signal therefrom. According to another aspect, the apparatus generates an alarm immediately when detection is made thereby that the door is being closed when the disk is being ejected.

1 Claim, 6 Drawing Sheets

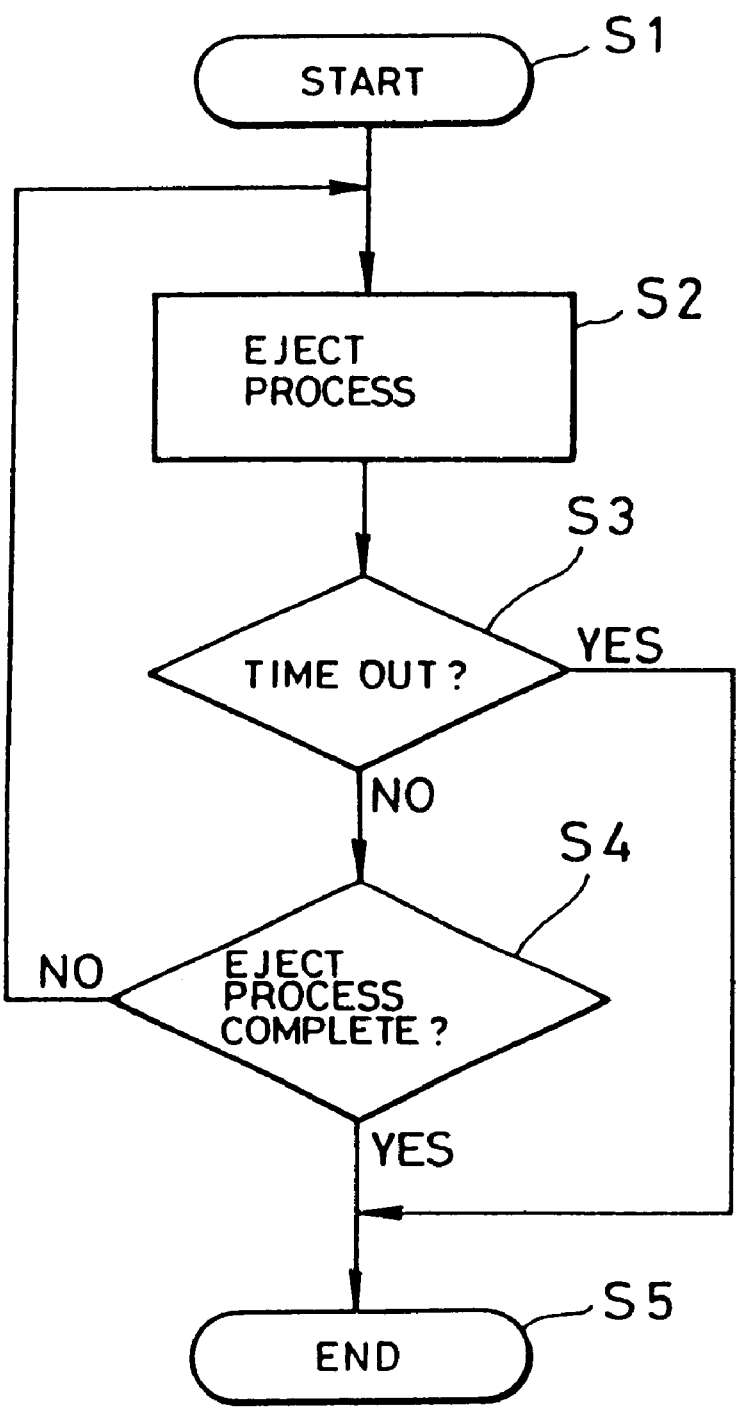

AUTO-LOADING DISK PLAYER

BACKGROUND OF THE INVENTION

1. Field of the Invention

The present invention relates to an auto-loading disk player for a compact disk or the like recording disk.

2. Description of Background Information

Among compact disk play back apparatuses in the conventional technology, there are disk playback apparatuses designed specially for mounting in a vehicle. In the case of those playback apparatuses, an area for providing there an operation panel or a display panel of the apparatus is limited due to a confined space in the vehicle. For this reason, there has been proposed a disk playback apparatus, in which a console panel and an indicating section with many operating buttons arranged therein are provided in internal and external sections of a door rotatably provided in the main body of the disk playback apparatus, and a disk inserting port is provided inside the door. FIG. 1A to FIG. 1C are views each schematically showing a vehicle-mounted auto-loading disk player based on this system. Detailed description will be made for a method of loading a disk as well as of ejecting the disk with reference to FIG. 1A to FIG. 1C.

FIG. 1A shows a state in which the door 2 of the disk playback apparatus 1 is opened. An internal section of this door is a console panel 3, and a disk eject key 4, a play key 5, and many other operating buttons, not shown herein, are arranged therein. Also, FIG. 1B shows a state in which a compact disk is accommodated in the internal section of the disk playback apparatus, and a disk 7 is loaded on a turn table 6. To detect a state in which the disk 7 has been loaded on the turn table 6, a load detecting device 8 for detecting a position such as a switch or a photo interrupter is provided near the periphery of the disk 7 loaded on the turn table 6. The method of loading a disk and the method of detecting the disk as described above are not described in detail herein because those methods are already disclosed in patent applications filed by the present applicant, i.e, Japanese Patent Application No. 63-52178 as well as in Japanese Patent Application No. 63-52179.

FIG. 1C shows a state in which the disk 7 is being ejected from the device, and the disk 7 is loaded to the device and ejected therefrom by rotating rollers 9 between which the disk 7 are held. The system is designed so that the disk 7 will be stopped in a position (ejected position) where it is ejected by substantially a half of the disk so that the disk will not drop therefrom. A position where the disk 7 stops is detected by an ejection detecting device 10, and the detection is executed with a similar switch or a photointerrupter provided for the load detecting device 8. Namely when the disk 7 is to be ejected, the door 2 is manually opened, and the eject key 4 on the console panel 3 is pressed, then the disk 7 is ejected from the disk inserting port 11 by the rotation of the rollers 9, the ejection detecting device 10 is stopped in the position specified by the ejection detecting device 10, and the ejecting operation is finished. After this step, the disk 7 is manually taken out. The control system as described above has also already been applied by the present applicant, which is disclosed in Japanese Patent Application No. 61-103506.

When the disk is to be loaded for the first time, the door 2 is manually opened, the disk 7 is inserted into the inserting port 11, and then the insertion is detected by the load detecting device, and the rollers 9 are automatically rotated in the loading direction (in which a disk is loaded), and the disk is transferred onto the turn table 6. When the load detecting device 8 detects the disk, the rotation of the rollers is stopped, the disk is loaded on the turn table 6 by a disk dropping function onto a turn table, which is not disclosed, and then the disk rotates thus performance being started.

As described above, in a case of the disk playback apparatus based on a vehicle-mounted auto-loading system, operations for opening/closing the door and inserting a disk are manually executed, but after these steps, all other operations are automatically controlled by a microcomputer, not shown herein, provided in the disk playback apparatus. Also, when the disk in an ejected position is to be played, the rollers are driven by lightly pressing said disk or by operating the player key, and a series of the controls as described above are executed.

FIG. 2 shows a flow chart of a series of operations in the ejecting process described above. The reference character S1 denotes a step at a point of time when the door 2 is completely opened and the eject key 4 is pressed. When the eject key 4 is pressed, an operation for ejecting the disk is performed in Step S2, and the disk 7 is ejected from the turn table 6. Step S3 is a process for setting a period of time required for an ejecting process as well as for preventing the rollers from being hooked during the ejecting process and continuing its rotation, and if the process is operated within the preset period of time, system control shifts to Step S4, while if a time required for the process exceeds the preset period of time, system control shifts to Step S5, and even when the ejection has not completed, rotation of the rollers 9 are forcefully stopped to finish the operation. If the ejecting process is executed within the preset period of time, detection is made as to whether the disk has been ejected or not in Step S3. This step of detection for ejection is shifted to Step S2 when the disk is not present in the eject position, and a series of the operations are continued therein. If it is detected that the disk has been ejected, determination is made that the disk 7 has normally been ejected, and the rollers 9 are stopped in Step S5 to finish a series of the operations.

However, there are many cases where the door may carelessly be closed, immediately after the user has processed an eject key to take out a disk, by user's hand or body contacting with the door because of a narrow space of the vehicle or by a user inadvertently pressing the eject key when the door is closed. In those cases, since the eject key has been operated, the microcomputer performs the operation to rotate the rollers and tries to continue a series of operations according to the procedures to be executed when the eject key is operated, such as ejection of the disk. However, as shown in FIG. 1C, there are some cases where the door comes in contact with the periphery of the disk which is moving, because the door is rotated and moved in the direction to which the door is closed. In other case, the user may carelessly touch the recording surface of the disk, which may cause damage to the periphery or recording surface thereof. These problems may also occur in the case where the disk is left in the ejected state. Furthermore, if the disk which is being transferred is forcibly stopped by the door, which may cause damage to the disk surface by the rollers which are still rotated for driving, and additionally an adverse effect is given to a roller driving mechanism itself.

OBJECT AND SUMMARY OF THE INVENTION

It is therefore an object of the present invention to provide an auto-loading disk player in which either a disk is immediately loaded or an alarm is generated whenever a door of the player which is opened is unintentionally being closed.

The auto-loading disk player comprises a console panel movably provided in the front surface of a housing of a player; a recording medium inserting port arranged on the housing at the back of the console panel; and a transferring means for loading a recording medium inserted from the recording medium inserting port to the playback apparatus and ejecting the medium from the playback apparatus to the inserting port, and also has a detecting means for detecting an open/close state of the console panel therein, and a function for immediately loading a recording medium when it is detected that the console panel is not opened in at least one of states that the recording medium is being ejected and that the recording medium is positioned in the recording medium inserting port.

With a second aspect of the present invention, the auto-loading disk player comprises a console panel movably provided in the front surface of the housing of the player; a recording medium insertion port arranged on the housing at the back of the console panel; and a transferring means for loading a recording medium inserted from the recording medium insertion port to the playback apparatus and ejecting the medium from the playback apparatus to the inserting port, and also has a detecting means for detecting an open/close state of the console panel therein, an alarm generating means for generating an alarm, and a function for generating an alarm by the alarm generating means when it is detected that the console panel is not opened in at least one of states that the recording medium is being ejected and that the recording medium is positioned in the recording medium inserting port.

As described above, in the auto-loading playback apparatus with a door movably provided in the front surface of the disk playback apparatus and rollers for loading and ejecting the disk provided therein, it is possible to detect that the door is being closed and to immediately load the disk into the playback apparatus even when the disk is being ejected. Also it is detected that the door is being closed and an alarm can immediately be generated, which makes it possible to prevent any careless actions.

BRIEF DESCRIPTION OF THE DRAWINGS

FIG. 2 is a view showing a flow chart for ejecting operations in the example based on the conventional technology;

DETAILED DESCRIPTION OF THE PREFERRED EMBODIMENTS

Figure 1A:
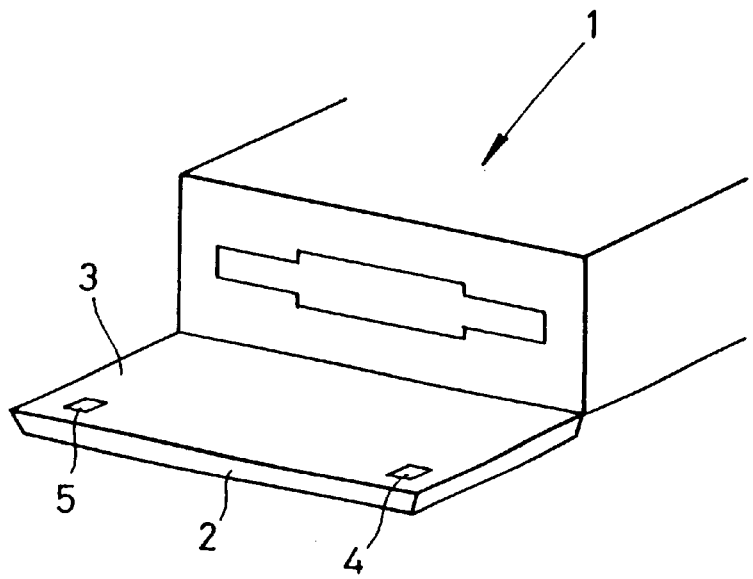
FIG. 1A to FIG. 1C are views each respectively showing a concept of an auto-loading system of disk playback apparatus in an example based on the conventional technology.
Figure 1B:
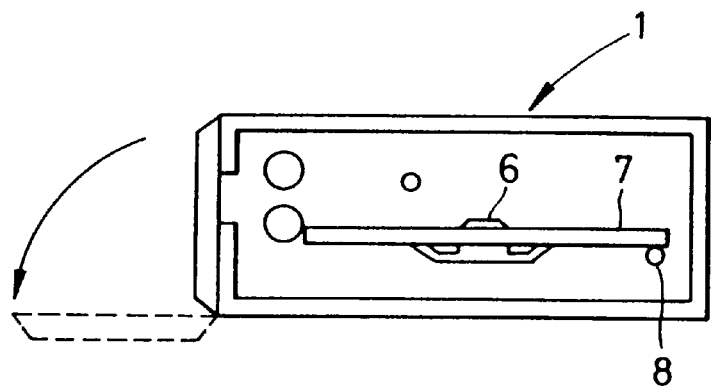
Figure 1C:
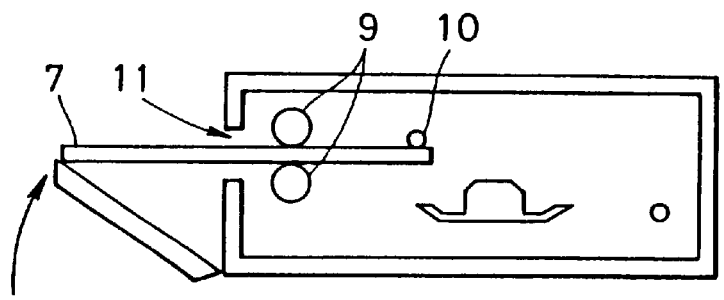

Detailed description is made for embodiments of the present invention with reference to FIG. 3 to FIG. 6. It should be noted that the same reference numerals are assigned to the same portions as those in the example based on the conventional technology.

Figure 3A:
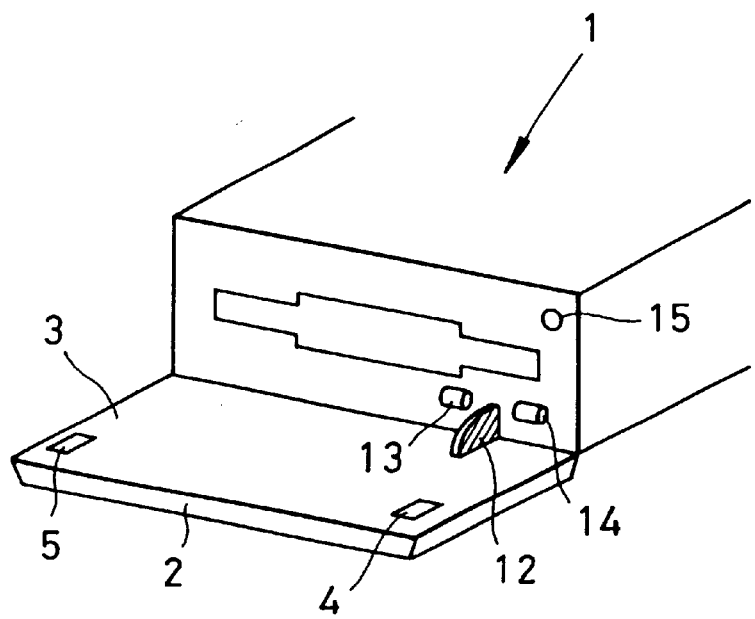
FIG. 3A to FIG. 3C are views each respectively showing a concept of an auto-loading system of disk playback apparatus according to the present invention.

FIG. 3A is a perspective view showing the disk playback apparatus 1 in a state in which a door 2 (console panel) is opened. A console panel 3 with many operating buttons provided thereon and an display section are provided on the internal and external surfaces of the door 2 rotatably provided in the disk playback apparatus 1. Provided in the internal section of the door is also a fan-shaped shielding plate 12 indicated by the shaded area. A light emitting element 13 such as an LED is provided at a position opposite to the surface of the shielding plate 12, while a light receiving element 14 is provided at a position opposed to the light emitting element 13 in the other surface of the shielding plate 12, and both of which constitute a door open/close detecting device.

A light beam emitted from the light emitting element 13 is released from the shielding plate 12 after the door 2 is completely opened, and a light path to the light receiving element 14 is formed. A positional relation of the light path between the light emitting element 13 and the light receiving element 14 and the shield plate 12 is constructed so that, when the door is moved even slightly for closing, the light path will be cut by the periphery of the shielding plate 12. Namely, when the door is being closed, the shielding plate 12 is inserted between the light emitting element 13 and the light receiving element 14 and the shield plate 12 is constructed so that, when the door is moved even slightly for closing, the light path will be interrupted by the periphery of the shielding plate 12. Namely, when the door is being closed, the shielding plate 12 is inserted between the light emitting element 13 and the light receiving element 14, so that the light receiving element can not receive the light from the light emitting element 13, and becomes immediately OFF (to be cut). When the door 2 is completely opened, the shielding plate 12 is removed from an area between the light emitting element 13 and the light receiving element 14, so that the light receiving element 14 becomes ON (to be connected) by receiving the light from the light emitting element 13.

An output signal 14 from the light receiving element 14 in the door open/close detecting device, is supplied to the microcomputer, and is programmed so that the microcomputer can control system operations in response to the output signal from the light receiving element 14.

It should be noted that description above assumes an example that a positional detection of the shielding plate 12 is constructed with a light emitting element 13 and a light receiving element 14, but the same effect can be obtained even if this system is constructed with simple mechanical switches or the like.

Figure 3B:
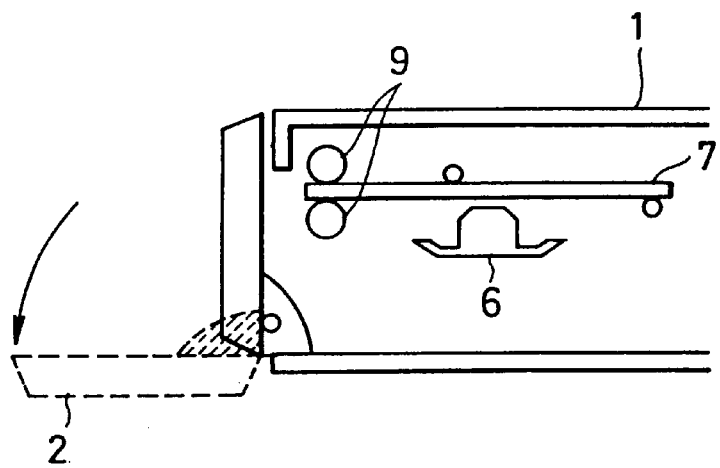
Figure 3C:
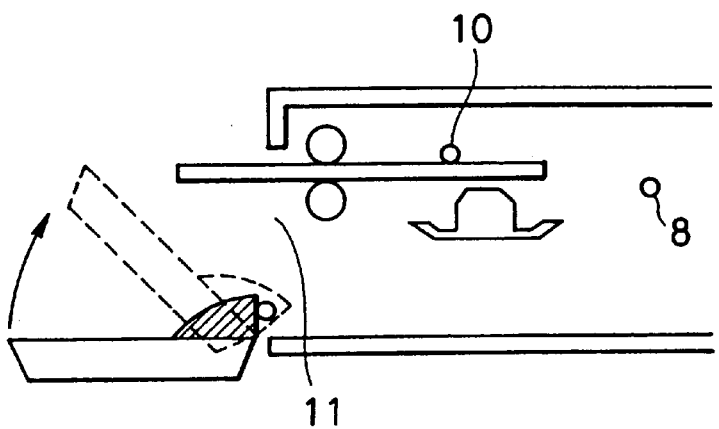

Herein description is made for a series of operations for the disk playback apparatus based on the auto-loading system by using the door open/close detecting means according to the present invention with reference to FIG. 3B and FIG. 3C.

In FIG. 3B, when the door 2 is completely opened to take out a disk 7 of the disk playback apparatus 1, a light receiving element 14 in the door open/close detecting device becomes ON (connected). Then, when an eject key 4 on a console panel 3 is pressed, the disk 7 is transferred to rollers 9, and is ejected from a disk inserting port 11 by rotation of the rollers, and the ejecting operation is continued until an ejection detecting device 10 is operated. However, if the door 2 is closed even slightly either when the disk 7 is moving by the ejecting operation, or when the disk is stopped at the ejected position, the light receiving element 14 in the door open/close detecting device becomes OFF, so that the rollers 9 immediately start a loading operation, the disk is transferred into the disk playback apparatus and is placed on a turn table 6, which means that system control returns to the operating state before the eject key 4 is pressed. When the door 2 is completely opened while the disk is being ejected, however, the disk is stopped at the ejected position, namely in the position where the disk is ejected by substantially a half there, and a series of the operations is finished.

Figure 4:
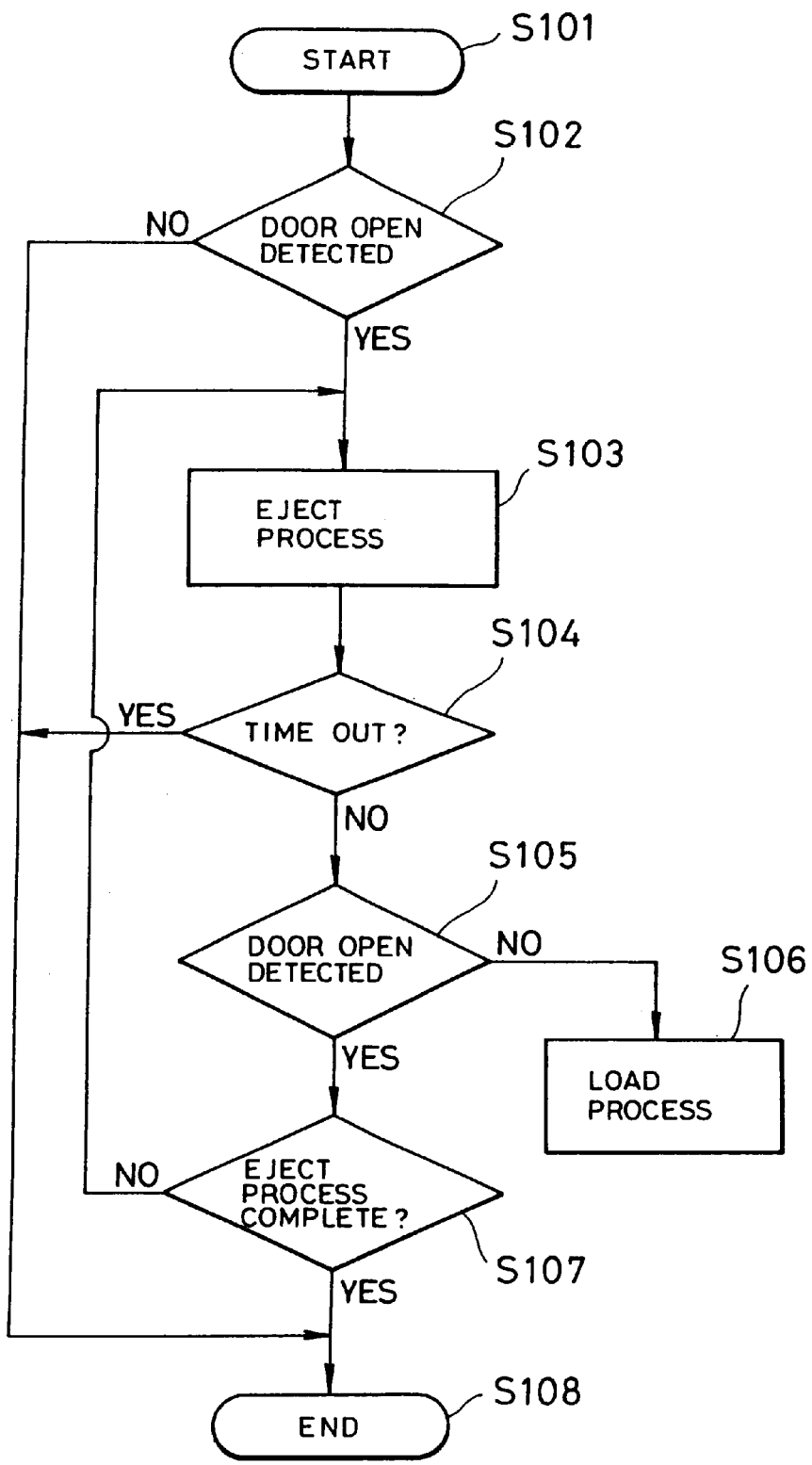
FIG. 4 is a view showing a flow chart for ejecting operations in a first embodiment of the present invention.

The ejecting operations of the disk in the first embodiment of the present invention is as described above, and detailed description is made for the operations with reference to the flow chart shown in FIG. 4.

When an operation for ejecting a disk is started by pressing an eject key 4 by a user or somebody (Step 101), at first, determination is made as to whether the door 2 has completely been opened or not (Step 102). When it is determined that the door has not been opened at this point of time, the ejecting processing is terminated (Step 108). On the other hand, when it is determined that the door has completely been opened, the ejecting processing is started (Step 103) and the disk is started to be ejected from the turn table 6.

In this step, a counter, which is not shown herein, provided inside the disk playback apparatus 1 starts a count-up operation for monitoring a time required for ejecting the disk in the ejecting operation. In a case where it is determined that the time required for ejection exceeds a predetermined period of time during the ejecting processing (Step 104), it is determined that the disk must have been caught by some internal mechanism of the disk playback apparatus 1 or by something in the ejecting process, and the ejecting processing is immediately terminated (Step 108). With this feature, it is possible to prevent damage to both surfaces of the disk 7, and further to prevent breakage of the rotating mechanism of the rollers. When the ejecting time is within the predetermined period of time, the ejecting processing is continuously executed.

Even after the ejecting processing is started, it is always monitored whether the door 2 is kept completely open or not (Step 105). When it is detected that the door 2 is not completely opened thereafter, namely when the door 2 is closed even slightly, the load processing is immediately executed (Step 108), the disk 7 is loaded into the internal section of the disk playback apparatus 1, the disk 7 is again placed on the turn table 6, and then the load processing is finished. On the other hand, when the door is kept completely open thereafter, monitoring is executed as to whether the ejecting processing (the disk is ejected) has been completed or not (Step 107), and if the completion thereof can not be detected, a series of operation for ejecting the disk described above is continuously executed, and is finished at a point of time when the completion thereof is detected (Step 108).

Figure 5:
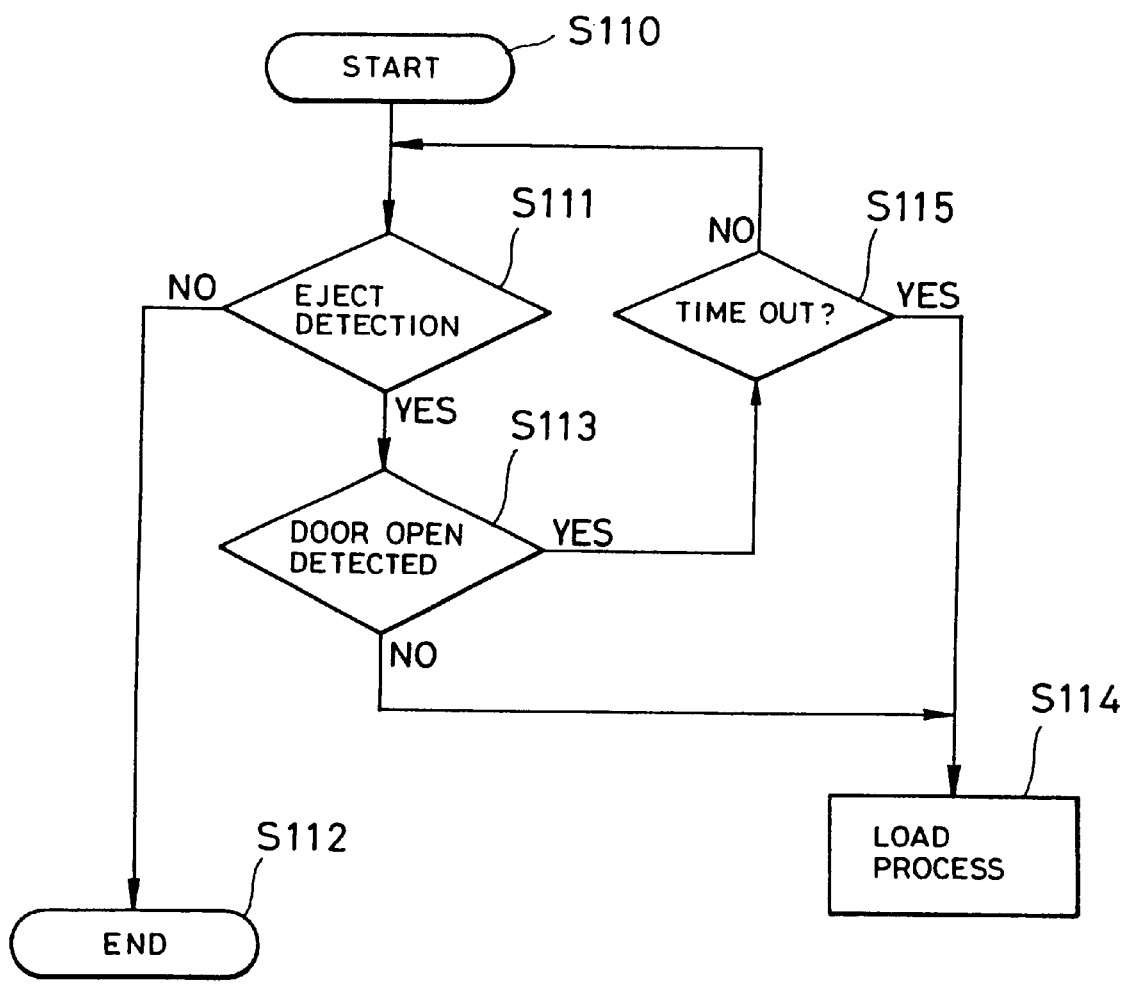
FIG. 5 is a view showing a flow chart for operations of ejecting process according to the present invention.

Next, detailed description is made for an operation for monitoring the disk 7 in a state where the ejecting processing is completed and the disk 7 has been projected by substantially a half thereof from the opening for disk loading and ejecting in the disk playback apparatus 1 with reference to the flow chat shown in FIG. 5.

The monitoring processing is started from a point of time when the ejecting processing has been completed (Step 110), then at first monitoring is executed as to whether the disk 7 is present at the eject position or not (Step 111), and when it is determined that the disk 7 is not present there, it is determined that the disk 7 has been taken out of the eject position by the user, and this processing is finished (Step 112). As long as it is determined that the disk 7 exists at the eject position, monitoring as to whether or not the door 2 has completely been opened is always executed (Step 113), and in this step if it is detected that the door 2 is not completely opened, namely when the door 2 is closed even slightly, system immediately executes a load processing (Step 114), and stops the load operation at a point of time when the disk 7 is loaded into the internal section of the disk playback apparatus 1 and is placed again on the turn table 6.

While a state in which the door 2 was completely opened is maintained, determination is made as to whether a period of time for the disk to be left in the ejected position exceeds the predetermined period of time or not (Step 115). It should be noted that a measurement period of time for the disk to be left therein is started by a counter, not shown herein, provided inside the disk playback apparatus 1 by starting a count-up operation when the present processing is started, whereby a period of time when the disk 7 is left in the ejected position is monitored. When it is determined herein that the time for the disk to be left therein has exceeded the predetermined period of time, the load processing is executed as described above (Step 114). With this feature, it is possible to prevent the disk 7 from being left at the ejected position for a long period of time, whereby it is also possible to prevent a user from carelessly contacting the disk as well as to prevent deformation of the disk itself. Then the series of operations described above is continuously executed as long as a time for the disk 7 to be left therein does not exceed the predetermined period of time.

Figure 6:
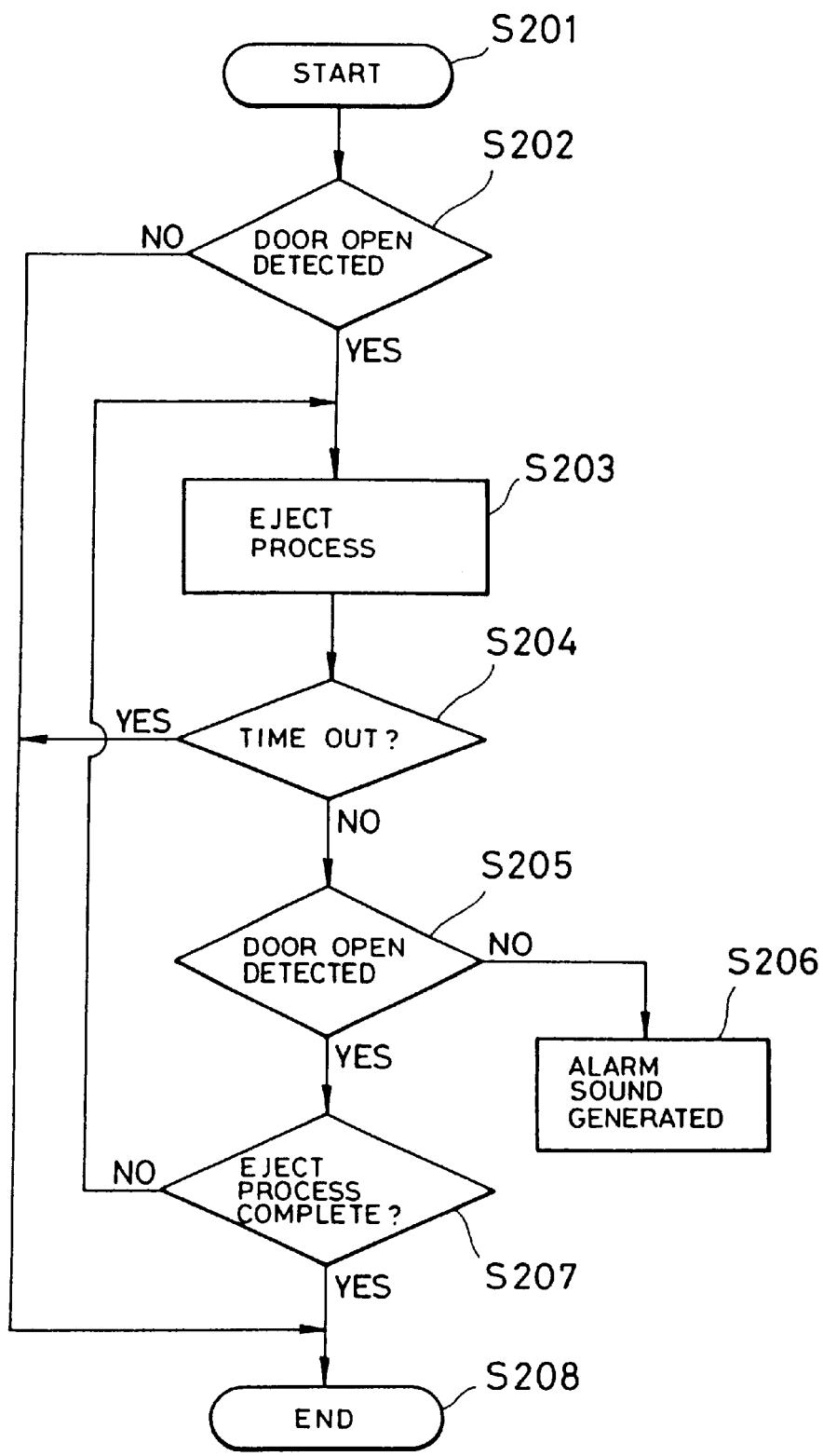
FIG. 6 is a view showing a flow chart for ejecting operations in a second embodiment of the present invention.

Detailed description is made for the second embodiment of the present invention with reference to the flow chart shown in FIG. 6. In the flow chart shown in FIG. 6, Steps 201 to 205, Steps 207 and 208 correspond to Steps 101 to 105, Steps 107 and 108 in the first embodiment of the present invention respectively, and also the same processing operations as those therein are executed respectively.

A characteristic portion in the second embodiment is the fact that an alarm is generated (Step 208) in place of the execution of the loading processing (Step 108) described in the first embodiment of the present invention. Namely, whether a state, in which the door 2 is opened, is kept or not after start of the ejecting processing is always monitored (Step 205), and when it is detected that the door 2 is not completely opened after start of the ejecting processing, namely when the door is closed even slightly, an alarm is immediately generated (Step 206).

Description of each embodiment above assumes a case where either the loading processing (Embodiment 1) and generation of an alarm (Embodiment 2) is executed when it is detected that the door 2 has not been opened after start of the ejecting processing, but the present invention is not limited to only the processing sequence above, and when it is detected that the door 2 is not completely opened after the start of the ejecting processing, both of the loading processing and generation of an alarm may be executed.

As described above, with the present invention, the autoloading disk player detects that the door is being closed even slightly when the disk is being ejected or when the disk is stopped in the ejected position, and immediately loads the disk into the disk playback apparatus, so that opening/closing of the door does not cause damages to the periphery or the recording surface of the disk, and furthermore damages to a roller mechanism can be prevented. Also, an alarm is immediately generated as soon as it is detected that the door is closing even slightly when the disk is being ejected or when the disk is stopped in the ejected position, so that careless operations for opening/closing the door does not cause any damage to the periphery or recording surface of the disk.

What is claimed is:

1. An auto-loading disk player comprising:

a manually movable console panel rotatably mounted on a front surface of a housing for the player;

a disk recording medium inserting port provided on said housing at the back of said console panel; and a transferring means for loading a disk recording medium inserted from said disk recording medium inserting port into a playback mechanism and ejecting the medium from the playback mechanism to said disk recording medium inserting port, and a detecting means for detecting and providing a signal representative of an opening/closing state of said console panel; wherein during the process of ejecting the disk recording medium, the transferring means is responsive to said signal from the detecting means for immediately loading said disk recording medium thereinto when it is detected that said console panel is not open and the disk recording medium is either being ejected or the recording medium is positioned in said recording medium inserting port, having been ejected.

* * * * *